United States Patent [19]
Sharp et al.

[11] 3,910,536
[45] Oct. 7, 1975

[54] DISTRIBUTING POST FOR WIRE INTERCONNECTING POINTS

[75] Inventors: Larry L. Sharp, Schaumburg; Edmund J. Soltysik, Chicago, both of Ill.

[73] Assignee: Illinois Tool Works Inc., Chicago, Ill.

[22] Filed: June 24, 1974

[21] Appl. No.: 482,217

[52] U.S. Cl. ......... 248/68 R; 174/72 A; 174/138 D; 248/220.5; 248/73
[51] Int. Cl.² ...................... F16L 3/22; H02G 3/00
[58] Field of Search .......... 248/49, 65, 67.7, 68, 71, 248/73, 216, 220.5, 223, 361 R, DIG. 3; 174/72 A, 138 D; 24/73 P; 317/122; 339/119 R, 119 C, 125, 126, 128, 198 G, 198 GA

[56] References Cited
UNITED STATES PATENTS

| 754,123 | 3/1904 | Bullard | 248/220.5 |
|---|---|---|---|
| 853,040 | 5/1907 | Taber | 248/65 |
| 927,701 | 7/1909 | Woodmansee | 248/220.5 |
| 2,626,773 | 1/1953 | Backman | 248/DIG. 3 |
| 3,346,688 | 10/1967 | Fields | 174/72 A |
| 3,393,350 | 7/1968 | Goudy et al. | 317/122 |
| 3,443,783 | 5/1969 | Fisher | 248/220.5 |
| 3,568,964 | 3/1971 | Perkins | 248/68 R |
| 3,672,614 | 6/1972 | Guerry | 248/68 R |

FOREIGN PATENTS OR APPLICATIONS

| 662,927 | 12/1951 | United Kingdom | 339/126 RS |
|---|---|---|---|
| 899,967 | 12/1953 | Germany | 174/72 A |
| 1,640,788 | 2/1971 | Germany | 339/119 R |

Primary Examiner—Roy D. Frazier
Assistant Examiner—Lawrence J. Staab
Attorney, Agent, or Firm—Olson, Trexler, Wolters, Bushnell & Fosse, Ltd.

[57] ABSTRACT

A distributing post for guiding cables and wires at a terminal interconnecting point is disclosed. The post comprises a fastener, a mast, and a top. The fastener includes a base adapted to mate with a terminal point backboard hole, and a head angularly offset from the base to retain the base in the backboard hole. The mast includes outwardly extending webs to counteract bending forces applied to the post. The top includes outwardly extending fingers adapted to receive and retain an interconnector extending to an adjacent post. Bulky cable and wire bundles can be restrained between adjacent posts and under the interconnector.

10 Claims, 12 Drawing Figures

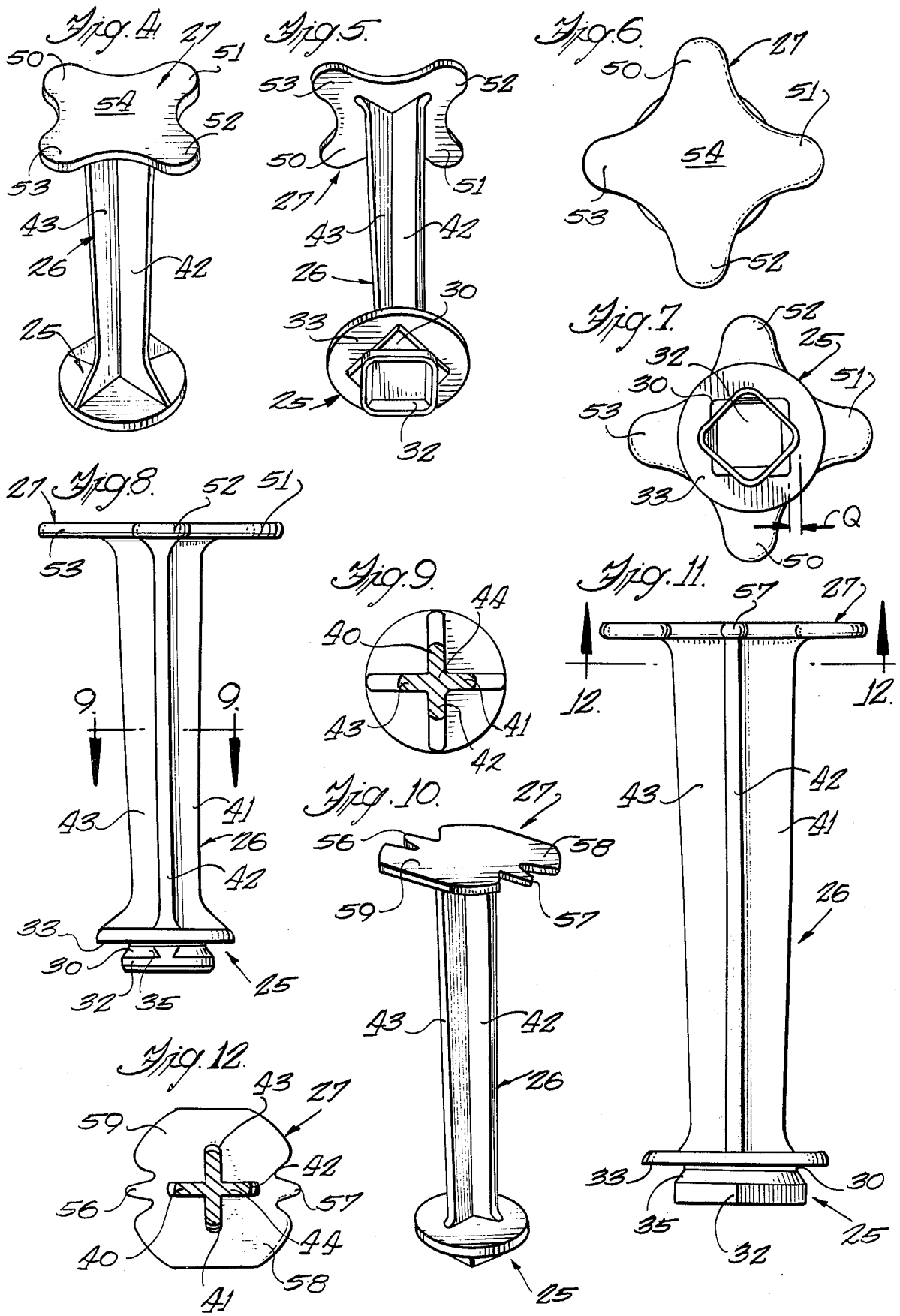

DISTRIBUTING POST FOR WIRE INTERCONNECTING POINTS

BACKGROUND OF THE INVENTION

This invention relates generally to apparatus for mounting and interconnecting telephone cables and like wires at a wire terminal connecting point, and more particularly concerns a post member for aligning and guiding cables extending to and from the connecting point.

In modern commercial or industrial key telephone systems and the like electrical wiring installations, multi-wire terminal interconnecting points are necessary. At these interconnecting points, a number of wires lead, sometimes in cable form, from a telephone central office or other location. At the connecting point, these wires can be individually connected to wires coming from a number of individual telephone sets or other equipment. The connecting point permits centralized system hookup, and provides a common terminal point which can be altered as system demands and equipment changes require.

In such systems, it is not uncommon to have many hundreds of wires leading to and from the connecting point. Although most or all such wires may be combined in a number of cables, the number and bulky size of the cables make important the provision of interconnecting point facilities for routing the arriving and departing cables in an organized and coherent manner. Preliminary wire and cable routing devices can also assist in preventing excessive strain from being applied by the cables to the terminal connectors themselves.

Presently, some apparatus offered for the construction of terminal connecting points includes relatively simple post devices, which are sometimes termed distributing rings. These distributing posts or rings are adapted to protrude from a terminal connecting point backboard or similar foundation.

Many of these distributing post designs have been found to be unnecessarily expensive in initial cost, and most have required separate fasteners such as screws or like devices to connect the posts to the foundation backboard. Often, the use of screws or other fasteners means screwdrivers or other tools are required to complete terminal assembly. In addition, many posts have been found to adequately restrain and guide the cables when the cables are relatively few in number; however, as additional cables are added, the restrained cable bundle becomes increasingly bulky, and cables at or near the top of the cable bundle occasionally slide or fall over the tops of the restraining posts. Such cable movement can put strain on the terminal connecting points, and defeats the intended purpose of the posts.

It is therefore an object of the present invention to provide an improved distributing post of low cost, long service life, and rigid, rugged construction.

Another object is to provide a one-piece post including an integral fastener for securing the post to a backboard or other foundation surface. A related object is to provide such a post which can be secured to the foundation backboard without screws or other separate fastening parts. Another related object is to provide such a distributing post which can be secured to the backboard without the use of screwdrivers or other tools.

Yet another object is to provide a distributing post which is adapted to receive and retain interconnectors extending between adjacent posts. These interconnectors help retain bulky cable bundles between the posts and below the post tops. A related object is to provide a distributing post which is adapted to accommodate a variety of interconnectors of even a simple and inexpensive type.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 4 is a top perspective view showing the distributing post in further detail;

FIG. 5 is a bottom perspective view showing the distributing post of FIG. 4;

FIG. 6 is a top plan view of the distributing post shown in FIGS. 4 and 5;

FIG. 7 is a bottom plan view of the distributing post shown in FIGS. 4–6;

FIG. 8 is a side elevational view of the distributing post shown in FIGS. 4–7;

FIG. 9 is a sectional view taken substantially in the plane of line 9—9 in FIG. 8;

FIG. 10 is a top perspective view similar to FIG. 4 but showing an alternate embodiment of the distributing post;

FIG. 11 is a side elevational view of the distributing post shown in FIG. 10; and FIG. 12 is a sectional view taken substantially in the plane of line 12—12 in FIG. 11.

DETAILED DESCRIPTION

While the invention will be described in connection with a preferred and an alternate embodiment, it will be understood that it is not intended to limit the invention to these embodiments. On the contrary, it is intended to cover all alternatives, modifications and equivalents as may be included within the spirit and scope of the invention.

Figure 1:
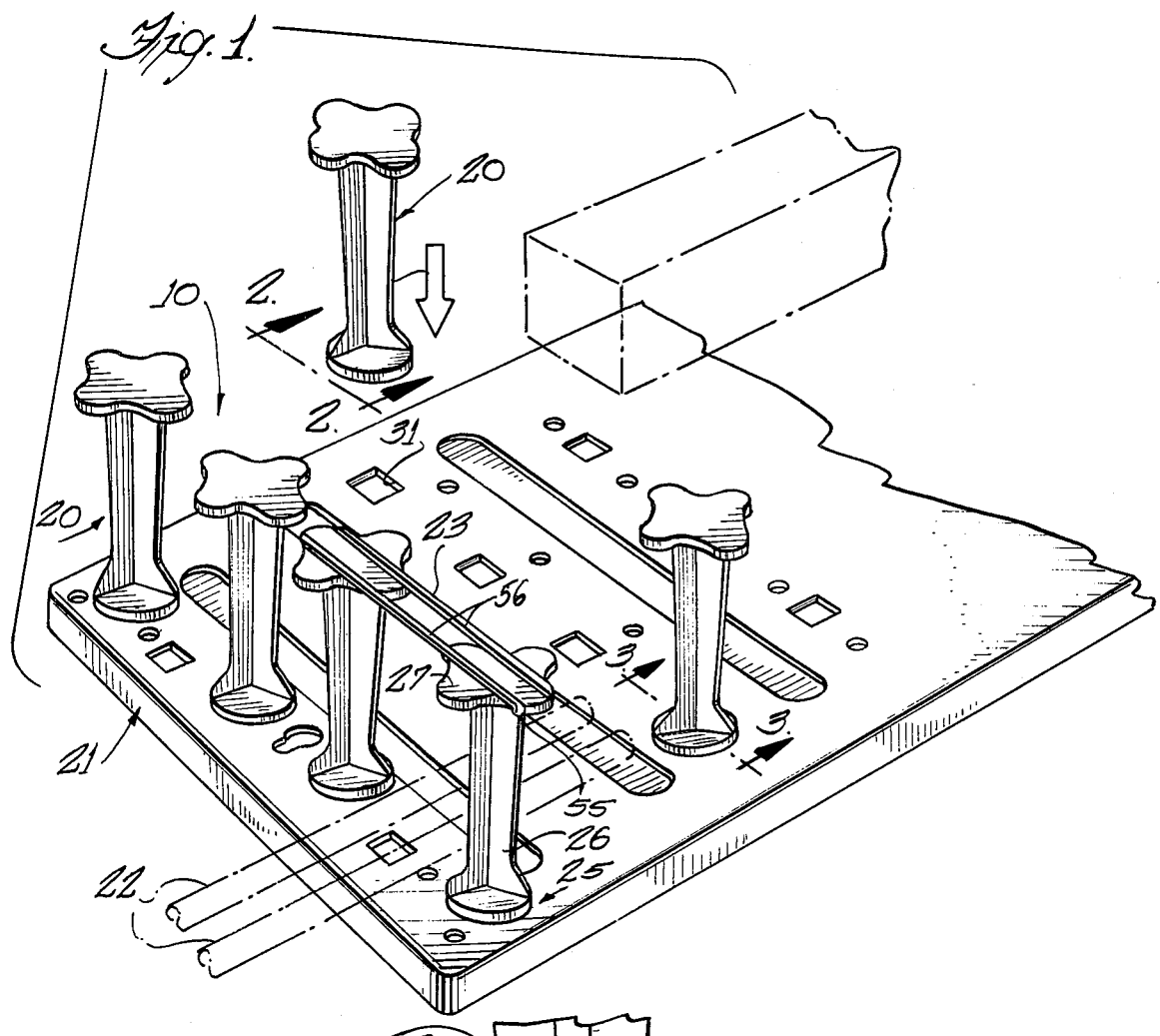
FIG. 1 is a perspective view showing several novel distributing posts of the present invention as they appear when attached to a mounting backboard or a similar foundation surface.

Turning first to FIG. 1, there is shown the novel distributing post 20 of the present invention. As illustrated, a number of these posts 20 are secured to a mounting backboard 21. Between the posts 20, a number of wires or multi-wire cables 22 are threaded or laid; these cables 22 can be routed from distant telephone central offices or other points to terminal connecting blocks or other wires (not shown). To retain these cables 22 in the illustrated locations, one or more post interconnector members 23 are provided. In general, these posts comprise a bottom fastener portion 25, an intermediate mast portion 26 and a top 27.

Figure 2:
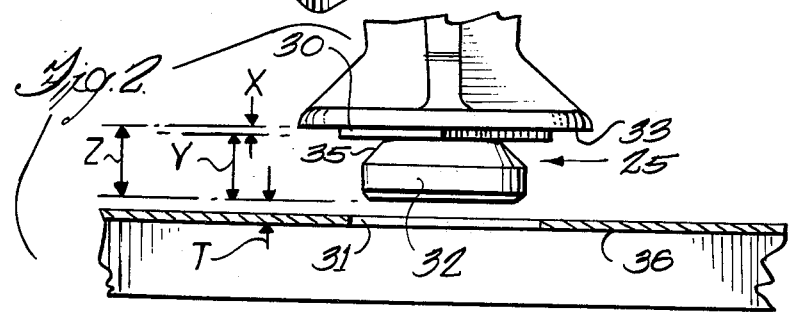
FIG. 2 is a fragmentary sectional view taken substantially in the plane of line 2—2 in FIG. 1 showing, in exploded relation, the distributing post fastener and post-receiving backboard.
Figure 3:
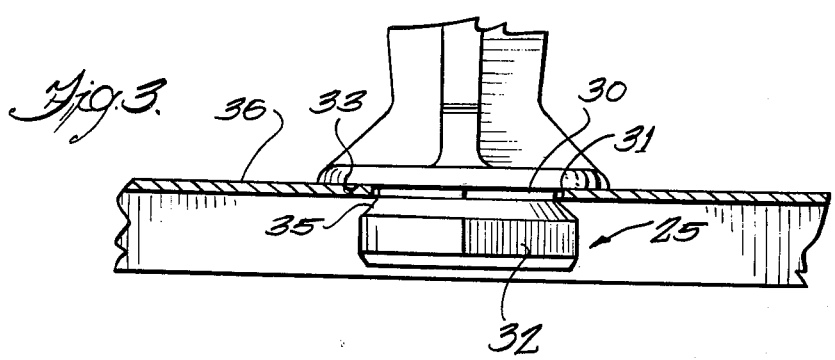
FIG. 3 is a sectional view similar to FIG. 2 and taken substantially in the plane of line 3—3 in FIG. 1 and showing the post fastener and backboard as they appear when the post is secured to the backboard.

In accordance with one aspect of the invention, the fastener 25 includes means for securing the bracket to the backboard 21 in a predetermined location and in a predetermined angular orientation relative to the backboard. Here, the fastener 25 includes a base 30 which is of a given thickness X, as shown in FIG. 2 and which is of polygonal cross-sectional shape substantially coextensive with a base-receiving hole 31 formed in the backboard 21, as shown in FIG. 3. From the fastener base 30, a head 32 projects which is of polygonal cross-sectional shape at least congruent, if not co-extensive, with the hole 31, i.e., the head cross-section is the same shape as the hole 31, but may be smaller in size than the hole. However, as best seen in FIGS. 5 and 7, this head 32 is offset with respect to the base 30; here, this offset takes the form of an angular offset of substantially 45°. As shown in FIG. 2, the head 32 projects from the base 30 for a predetermined distance Y; together, the base 30 and the head 32 can be considered to project from a fastener foundation plane 33 a total predetermined distance Z.

When it is desired to mount the distributing post 20 on the backboard 21, the post 20 is oriented as illustrated in FIG. 1 and moved toward the addressed backboard 21 in the direction indicated by the arrow A. Such addressing motion moves the fastener 25 from the relative position illustrated in FIG. 2 into the backboard with the head being pushed into and through the backboard hole 31.

When the post 20 is so preliminarily mounted, the installer then turns the post through one-eighth of a revolution. This rotative motion aligns the base 30 with the hole 31 and causes the base 30 to snap into and substantially fill the hole 31, as illustrated in FIG. 3. Thus located, head cam surfaces 35 resiliently engage backboard material 36 adjacent to and defining the edges of the hole 31, and secure the fastened post 20 in place on the backboard 21.

To provide a rigid, secure post-backboard interlock, the backboard material 36 which defines the hole 31 is of a uniform thickness T equal to or greater than the thickness X of the fastener base 30. Moreover, this pan material thickness T extends uniformly away from each hole 31 for a distance at least equal to the amount of offset extension Q of the fastener head, thus permitting the head to rotatably snap into interlocking place and be firmly but resiliently secured in the desired angular location.

Since both the base 30 and hole 31 are polygonal in shape, the fastener base 30 is carried at a predetermined angular orientation within the hole 31; thus, the post 20 itself is mounted on the backboard 21 at a predetermined angular orientation.

Generally similar fastener arrangements are disclosed in U.S. Pat. Nos. 3,443,783 to Fisher and 2,940,558 to Schlueter, and in co-pending U.S. application Ser. No. 333,574 by Fisher, filed Feb. 20, 1973.

Arising from the fastener 25 is the mast 26. In accordance with another aspect of the invention, this mast 26 is constructed to resist bending stresses which may be applied to it by cables or interconnector members or other forces applied to the post top 27. To this end, the mast 26 comprises four webs 40–43, inclusive, emanating from a central portion 44 as shown in FIGS. 4, 5 and 8–12.

In accordance with yet another aspect of the invention, the post top is adapted to discourage cables 22 from falling or sliding over the post, and is further adapted to receive and retain one or more interconnector members 23 extending between the post top and the top of another, perhaps adjacent, post mounted on the backboard 21.

In the embodiment shown in FIGS. 1 and 4–9, this top 27 includes four fingers 50–53 emanating from a central portion 54. The fingers 50–53 are adapted to extend outwardly from the mast 26 in a predetermined angular direction, and to receive and retain an interconnector 23 which may take the form of a rubber band, a small wire, string, or some other relatively simple and inexpensive object. As shown particularly in FIG. 1, an end loop 55 of the interconnector 23 is carried under one finger while intermediate portions 56 of the interconnector 23 are routed over the remaining portions of the top 27 and away from the post in a direction opposite that in which the finger extends. Since the base 30 here illustrated is a polygon of four equal sides, it will be seen that no matter how the post 20 is installed on the backboard 21, the four fingers 50–53, spaced apart at equal angles, will be oriented as illustrated in FIG. 1 in alignment with the fingers of adjacent posts to receive and retain the interconnectors 23. Provision of a fastener base-polygon of N equal sides and a top including N equi-angularly spaced fingers eliminates possible misalignment of the post fingers with the fingers of adjacent posts, and obviates post misinstallation. Thus, a post 90 constructed in accordance with the invention cannot be misinstalled by even inexperienced personnel.

It is a feature of the invention that these top fingers 50–53 are angularly aligned with the mast webs 40–43. Thus, mast bending stresses imposed upon the post by forces applied by the interconnector 23 are counteracted, and post bending or warpage during the surface life of the post is counteracted or discouraged. Moreover, both the angular orientation of each post mast 26 and top 27 is related to the angular orientation of the post fastener 25 so as to align the fingers of all post tops 27 as shown in FIG. 1 to permit the illustrated positive interconnector attachment.

A second embodiment of the invention is shown in FIGS. 10–12. Here, a bilaterally symmetric top 27 is provided with two oppositely extending relatively narrow pin members 56 and 57, under which an end loop 55 of the interconnector member 23 can be slipped. Relatively large flange members 58 and 59 separate the pins 56 and 57 and assist in holding the interconnecting member 23 atop the post while retaining cables or wires 22 beneath and adjacent the post. Again, to counteract any bending forces applied by the interconnector member 23 or by the guided cables 22, the pins 56 and 57 are angularly aligned with two of the mast webs 40 and 42.

Construction of the novel post is relatively inexpensive. In the preferred embodiment, the entire post — fastener, mast and top — is formed as a single piece of resinous thermoplastic material. Moreover, the post can be easily formed by injection molding or other known convenient means. To this end, the post is designed to be bilaterally symmetric in its shape thus permitting easy spearation from its forming mold. The embodiment of the post shown in FIGS. 1 and 4–8 is quadrilaterally symmetric which further enhances ease of production.

The invention is claimed as follows:

1. A post for aligning cables or the like above a backboard or like mount, comprising a fastener, a mast and a top, the fastener including means for securing the post to the backboard in a pre-determined location and in a pre-determined angular orientation relative to the backboard, said mast including web means extending from the fastener in a pre-determined angular orientation, said top being substantially planar in configuration and positioned generally perpendicular to the axis of said fastener and mast, the peripheral edge of the top lying completely outside the peripheral limits of said mast, the top including means projecting outward therefrom in cantilevered fashion for receiving and retaining an interconnector extending between said top and the top of another post mounted on the backboard, said interconnector receiving and retaining means projecting outwardly from the top in substantially the same angular direction as said webs with said webs inhibiting post bending in the direction in which the interconnector receiving and retaining means extends.

2. A post according to claim 1 wherein the backboard or like mount has a pre-determined thickness, said fastener including a base of a thickness not greater than the backboard thickness and of polygonal cross-sectional shape substantially co-extensive with a polygonal mounting hole formed in the backboard, a head of polygonal cross-sectional shape at least congruent with the backboard hole but angularly offset with respect to and depending from the base, and cam surfaces extending from the head to the base to engage and retain the post on the backboard with the fastener base substantially filling the backboard hole.

3. A post according to claim 1 wherein said top has a cruciform configuration with the arms of the cruciform oriented so as to lie in a direction parallel as well as perpendicular to the sides of the mounting board.

4. A post according to claim 2 wherein said head is angularly offset with respect to said base at an angle of substantially 45°, the post being lockable to said backboard at a predefined angular orientation when the head is pushed into and through said backboard hole and the post is rotated through substantially one-eighth revolution to resiliently cam said fastener base into said backboard hole.

5. A post according to claim 1 wherein said fastener, mast and top are formed as a single piece of resinous thermoplastic material.

6. A post according to claim 1 having a bilaterally symmetric shape.

7. A post according to claim 1 having a quadrilaterally symmetric shape.

8. A post according to claim 2 wherein said fastener base is a polygon having N sides, and said top includes N fingers spaced at substantially equal angles from one another and extending away from the mast.

9. A post according to claim 1 wherein said fastener base is substantially square, and said top includes four fingers spaced apart from one another at angles of substantially 90°.

10. A post of the type claimed in claim 1 wherein said top includes a pair of sharp projecting fingers extending in opposite directions and broad uninterrupted surfaces extending in opposite directions in the quadrants between said fingers.

* * * * *